United States Patent [19]
Regnier

[11] Patent Number: 6,000,222
[45] Date of Patent: Dec. 14, 1999

[54] TURBOCHARGER WITH INTEGRAL TURBINE EXHAUST GAS RECIRCULATION CONTROL VALVE AND EXHAUST GAS BYPASS VALVE

[75] Inventor: Brian G. Regnier, Torrance, Calif.

[73] Assignee: Allied Signal Inc., Morristown, N.J.

[21] Appl. No.: 09/211,843

[22] Filed: Dec. 15, 1998

Related U.S. Application Data

[60] Provisional application No. 60/068,163, Dec. 18, 1997.

[51] Int. Cl.$^6$ .............................. F02B 37/00; F02M 25/06
[52] U.S. Cl. ........................................................ 60/605.2
[58] Field of Search ..................... 60/602, 605.2

[56] References Cited

U.S. PATENT DOCUMENTS

| | | | |
|---|---|---|---|
| 4,355,503 | 10/1982 | Grohn | 80/602 |
| 4,555,904 | 12/1985 | Melzer et al. | 60/605.2 |
| 5,406,796 | 4/1995 | Hiereth et al. | 60/605.2 |

FOREIGN PATENT DOCUMENTS

| | | |
|---|---|---|
| 0 531 277 A2 | 8/1992 | European Pat. Off. . |
| 3-160147 | 7/1991 | Japan ................................... 60/605.2 |
| 2 083 135 | 3/1982 | United Kingdom . |

OTHER PUBLICATIONS

Patents Abstracts of Japan, No. 06147027, May 27, 1994, Exhaust Recirculating Device, Takeshi.

Patent Abstracts of Japan, No. 55123244, Sep. 22, 1980, Exhaust Gas Reflex Apparatus for Diesel Engine, Yasutaka.

*Primary Examiner*—Michael Koczo
*Attorney, Agent, or Firm*—Felix L. Fischer

[57] ABSTRACT

A turbocharger is provided with an integral exhaust gas recirculation (EGR) chamber and valve contained within the turbine housing casting in conjunction with a conventional exhaust gas bypass or wastegate system. An exhaust gas back pressure control valve is also provided integral to the exhaust gas outlet for EGR flow control.

2 Claims, 2 Drawing Sheets

TURBOCHARGER WITH INTEGRAL TURBINE EXHAUST GAS RECIRCULATION CONTROL VALVE AND EXHAUST GAS BYPASS VALVE

CROSS REFERENCE TO RELATED APPLICATIONS

This application claims the priority of copending application Ser. No. 60/068,163 filed on Dec. 18, 1997 having the same title as the present application.

FIELD OF THE INVENTION

This invention relates generally to the field of turbochargers and internal combustion engine exhaust gas recirculation (EGR) systems for emissions improvement and, more particularly, to a turbocharger comprising an EGR control valve and an exhaust gas bypass valve or wastegate valve incorporated as an integral part of the turbocharger.

BACKGROUND OF THE INVENTION

Turbochargers for gasoline and diesel internal combustion engines are known devices used in the art for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft. Thus, rotary action of the turbine also causes the air compressor to spin within a compressor housing of the turbocharger that is separate from the exhaust housing. The spinning action of the air compressor causes intake air to enter the compressor housing and be pressurized or boosted a desired amount before it is mixed with fuel and combusted within the engine combustion chamber.

The amount by which the intake air is boosted or pressurized is controlled by regulating the amount of exhaust gas that is passed through the turbine housing by an exhaust bypass system or wastegate. The wastegate is actuated, during turbocharger operation when the boost pressure is approaching a maximum desired pressure, to divert an amount of exhaust gas away from the turbocharger turbine housing to reduce the rotational speed of the turbine and, thereby reduce the rotational speed of the air compressor and reduce the amount by which the intake air is pressurized. EGR is a known method for reducing NOX emissions in internal combustion engines. For effective use, an EGR system must overcome the adverse pressure gradient created by a positive pressure gradient across the engine, which is typical for example of modem high-efficiency diesel engines in at least a portion of their operating range. A conventional EGR system comprises a control valve that regulates the amount of exhaust gas that is taken from an engine exhaust manifold and returned to an engine induction system for mixing with the intake air and subsequent combustion. The EGR control valve is an ancillary device that is separate from both the engine and turbocharger. The conventional EGR system also includes a pump, separate from the turbocharger and engine, that increases the pressure of the returned exhaust gas routed by the EGR control valve to the induction system, to match the intake air charge or boost pressure exiting the turbocharger, thereby overcoming the positive pressure gradient across the engine.

Modem engine compartments, especially those of turbocharged internal combustion engines, are configured having minimal space for devices ancillary to the engine itself, thereby making use of such conventional EGR systems, comprising a separate control valve, pump, and exhaust and intake manifold bypasses, and related manifolding and plumbing difficult and sometimes impossible. It is, therefore, desirable that one or more devices of an EGR system be constructed as an integral member of an existing component of a turbocharged internal combustion engine, to thereby enable use of an EGR system within the spatial confines of a modern engine compartment. It is also desirable that the component of a turbocharged internal combustion engine be adapted to incorporate at least one device of an EGR system therein both without sacrificing performance of the engine component itself, and in a manner that provides enhanced EGR system operation.

DESCRIPTION OF THE DRAWINGS

The details and features of the present invention will be more clearly understood with respect to the detailed description and drawings in which.

DETAILED DESCRIPTION OF THE INVENTION

A turbocharger, constructed according to principles of this invention, comprises an exhaust valve disposed within an exhaust gas outlet casting of a turbocharger commonly identified as a turbine housing elbow casting, an EGR control valve disposed within the turbocharger turbine housing, and an exhaust bypass or wastegate valve also disposed within the turbocharger turbine housing. The exhaust valve is actuated to control the amount of exhaust back pressure in the turbine housing to provide a desired exhaust gas flow through the EGR control valve and out of the turbocharger turbine housing when the EGR control valve is actuated. The exhaust bypass valve is actuated to control the amount of exhaust gas routed through the turbine housing, thereby allowing the turbocharger to pressurize or boost the engine intake air a desired amount. The combination of both an EGR control valve and an exhaust gas bypass or wastegate valve as integral units to the turbocharger is an alternative embodiment of the invention disclosed in the patent application Ser. No. 09/212,110 entitled Integral Turbine Exhaust Gas Recirculation Control Valve which is assigned to the assignee of the present application and was filed substantially concurrently herewith. The disclosure of patent application Ser. No. 09/212,110 is incorporated by reference as though fully set forth herein.

Figure 1:
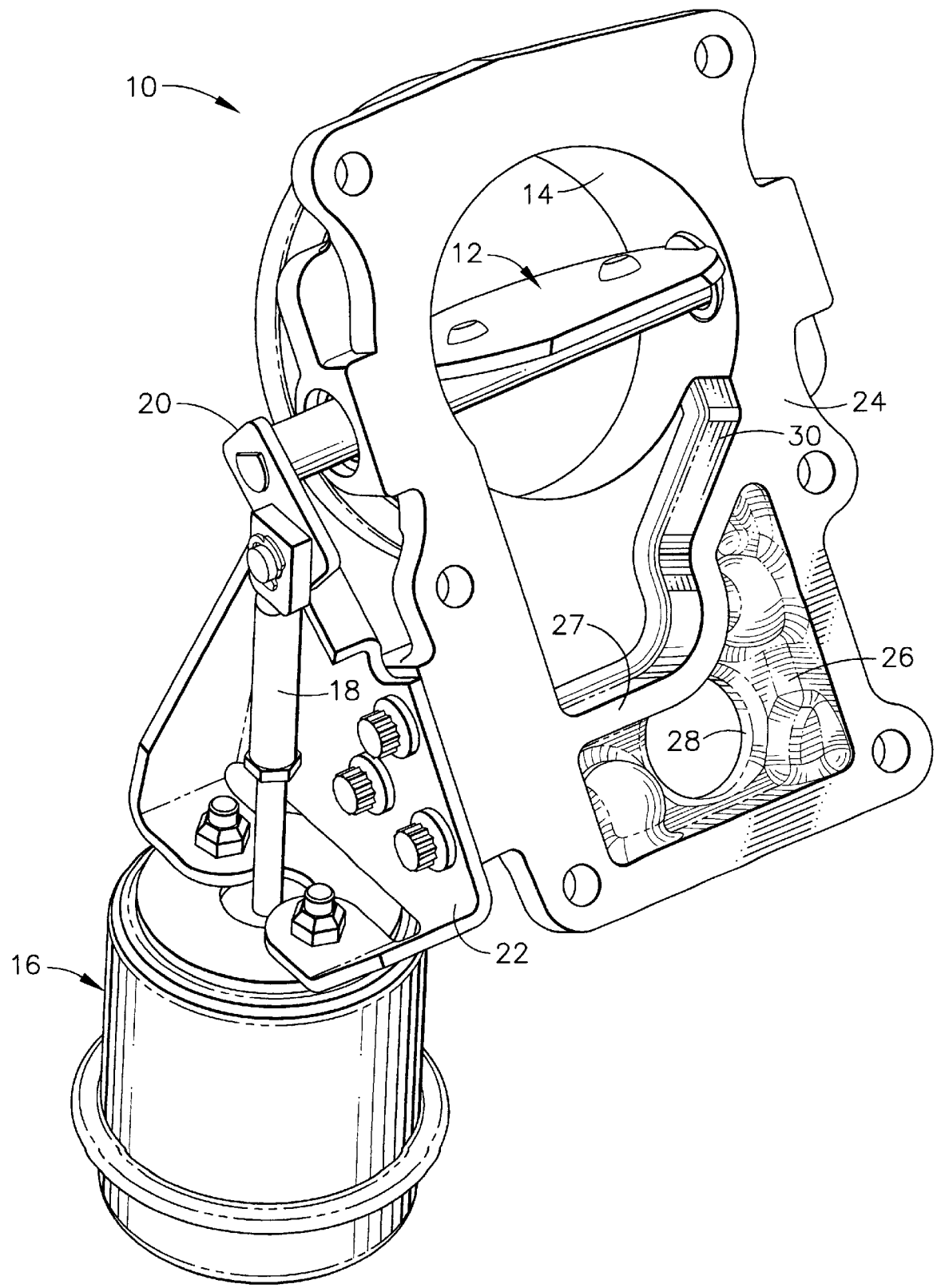
FIG. 1 is a perspective first side view of a turbocharger turbine housing elbow casting constructed according to principles of this invention.

Referring to FIG. 1, a turbocharger turbine elbow casting 10 incorporates an exhaust valve 12 that is rotatably disposed within an exhaust gas outlet 14 extending through the elbow casting. The exhaust valve 12 can be of conventional design, and is preferably in the form of a butterfly valve having a diaphragm diameter that is similar to that of the outlet 14, and that is disposed diametrically therein. The exhaust valve 12 is actuated within the outlet to restrict the flow of exhaust gas passing therethrough by conventional actuating means 16, such as by a pneumatic, electric or vacuum actuator. In a preferred embodiment, the actuating means 16 is in the form of a vacuum actuator that is connected to the exhaust valve by an actuating piston 18 attached at one end to stem 20 extending radially from the exhaust valve 12. The actuating means 16 is attached to the turbine elbow casting by a suitable mounting plate 22.

The turbine elbow casting 10 is adapted, along a mating surface 24, to be attached to a complementary surface of a turbocharger turbine housing. The turbine elbow casting mating surface 24 includes an EGR chamber 26 that is incorporated therein, and that is separated from the exhaust gas outlet 14 by wall 27. The EGR chamber 26 is configured having a size and depth sufficient to accommodate movement of an EGR control valve therein. The turbine elbow casting includes an outer-facing or backside surface (not shown) that is adapted to facilitate attachment of an EGR conduit or device (not shown) to the EGR chamber 26, and that includes an EGR passage 28 extending therethrough from the EGR chamber.

The turbine elbow casting 10 also includes an exhaust bypass chamber 30 that is incorporated therein and that is in communication with and extends radially from the exhaust outlet 14. The bypass chamber 30 is configured having a size and depth sufficient to accommodate movement of a bypass valve therein.

Figure 2:
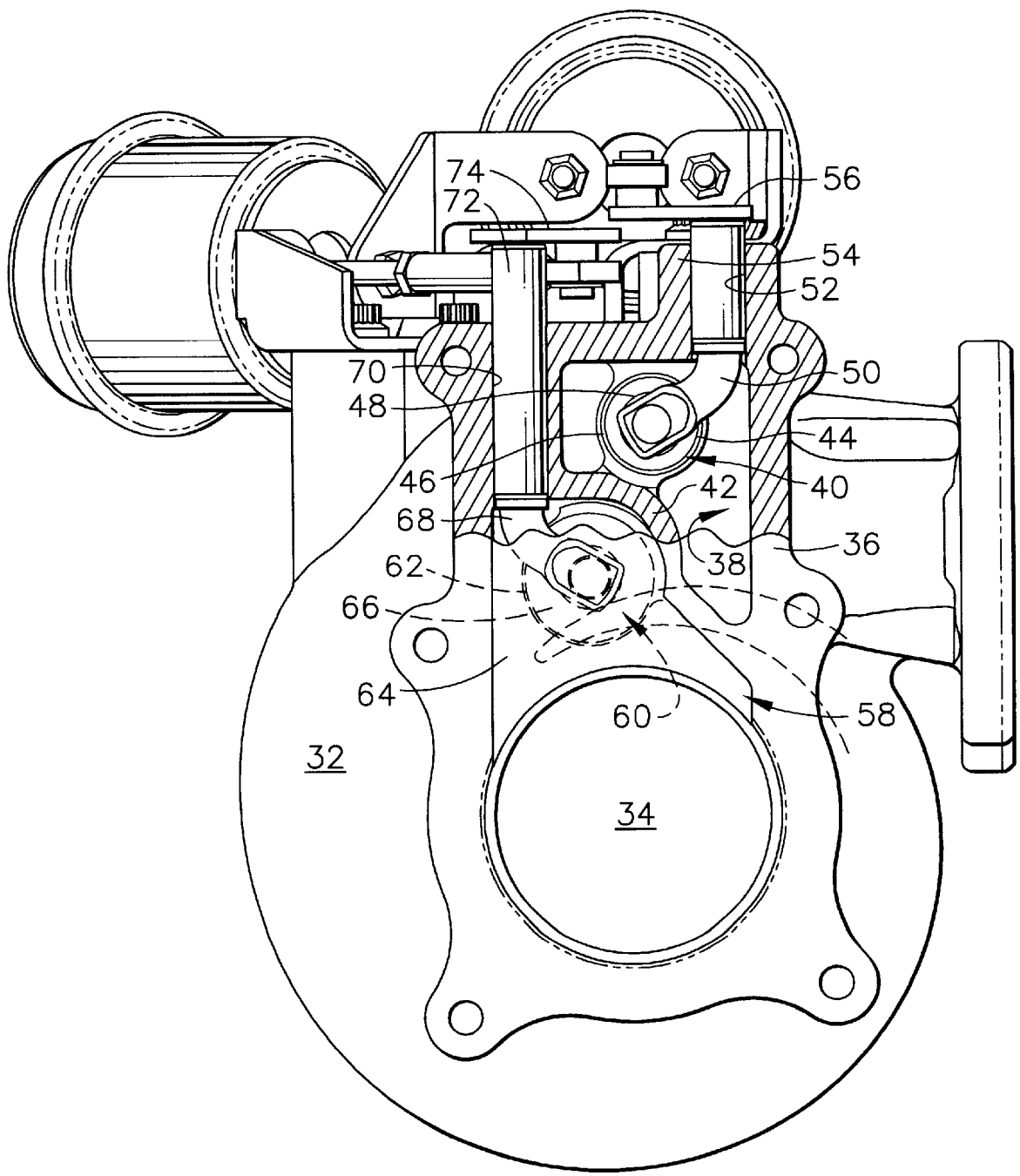
FIG. 2 is a side elevational view of the turbocharger turbine housing constructed according to principles of this invention.

FIG. 2 illustrates a turbocharger turbine housing 32 constructed according to principles of this invention. The turbine housing 32 includes an exhaust gas inlet (not shown) extending radially through the housing that is flanged to accommodate attachment to an internal combustion engine exhaust manifold. The turbine housing 32 includes a central opening 34 that extends axially therethrough. Although not illustrated, the turbine housing is adapted to contain a turbocharger exhaust gas-driven turbine therein. The turbine includes radially extending blades that are disposed within a turbine housing volute and that are contacted with exhaust gas entering the turbine housing exhaust gas inlet. The turbine housing is illustrated without a turbine disposed therein for purposes of clarity and reference. However, it is to be understood that the turbocharger turbine housing of this invention is intended to be used with parts conventional to turbochargers.

The turbine housing 32 includes a mating surface 36 that is adapted to mate with the complementary mating surface 24 of the turbine elbow casting 10, and that includes an EGR chamber 38 disposed therein. The EGR chamber 38 is configured having sufficient size and depth to incorporate an EGR control valve 40 therein. The EGR chamber 38 is separated from the turbine housing central opening 34 by wall 42. The EGR chamber 38 includes an exhaust gas passage 44 that extends through a wall surface 46 of the EGR chamber and that passes to a turbine housing volute.

The EGR control valve 40 is disposed within the EGR chamber 38 in a manner so that it seats against the exhaust gas passage 44 to prevent flow of exhaust gas therefrom when in a non-actuated state. The EGR control valve can be of conventional type, and in a preferred embodiment is in the form of a flapper valve comprising a poppet or diaphragm 48 positioned over the exhaust gas passage to prevent the passage of exhaust gas therefrom. An actuator arm 50 is attached at one of its ends to the diaphragm 48 and passes through an opening 52 in a wall section 54 of the EGR chamber 38. The actuator arm 50 is configured at an end 56 opposite the diaphragm 48 to accommodate attachment with a suitable actuating means (not shown), such as those described above useful for actuating the exhaust valve. In a preferred embodiment, the actuator arm 50 is configured to permit actuation of the EGR control valve diaphragm 48, to open and close the exhaust gas passage, by rotational movement of the actuating arm within the opening 52 caused by actuating end 56.

The placement or seating of the EGR valve diaphragm 48 over the exhaust gas passage 44 prevents exhaust gas within the turbine housing volute from exiting therefrom during operation of the turbocharger. The EGR valve 40 is actuated, e.g., in response to a control signal sent from an EGR controller or the like to an EGR control valve actuating means 16. The EGR control valve 40 is actuated after the exhaust valve 12 has been actuated to restrict the flow path of exhaust gas exiting from the central opening 34 through the turbine housing 32 via the exhaust gas outlet 14. After a desired back pressure is achieved within the turbine housing 32 and turbine volute, the EGR control valve 40 is actuated so that the diaphragm 48 is moved away from the exhaust gas passage 44, thereby permitting exhaust gas to be routed from the turbine volute, through the turbine housing EGR chamber 38, through the turbine elbow casting EGR chamber 26, and to an EGR device or EGR system plumbing attached to the turbine elbow casting backside surface. The exhaust gas removed from the turbocharger is then suitably treated, e.g., pressurized and adjusted for correct fuel to air ratio, for introduction into the intake air stream of the internal combustion engine.

The turbine housing 32 also includes an exhaust bypass chamber 58 that is in exhaust flow communication with, and that extends radially away from, the turbine housing central opening 34. The bypass chamber 58 is configured having sufficient size and depth to incorporate an exhaust bypass valve 60 therein. The bypass chamber 58 is separated from the EGR chamber 38 by wall 42. The bypass chamber 58 includes an exhaust gas passage 62 that extends through a wall surface 64 of the bypass chamber and turbine housing for communication to a turbine housing volute.

The bypass valve 60 is disposed within the bypass chamber 58 to seat against the exhaust gas passage 62 to prevent flow of exhaust gas therefrom when in a non-actuated state. The bypass valve can be of conventional type, and in a preferred embodiment is in the form of a flapper valve comprising a poppet or diaphragm 66 positioned over the exhaust gas passage to prevent the passage of exhaust gas therefrom. An actuator arm 68 is attached at one of its ends to the bypass valve diaphragm 66 and passes through an opening 70 in a wall section 54 of the EGR chamber 38. The bypass valve actuator arm 68 passes through a sleeve 72 that extends through the EGR chamber from wall section 44 to wall section 54. The actuator arm 68 is configured at an end 74 opposite the bypass valve diaphragm 66 to accommodate attachment with a suitable actuating means (not shown), such as those described above useful for actuating the exhaust and EGR control valves. In a preferred embodiment, the actuator arm 68 is configured to permit actuation of the bypass valve diaphragm 66, to open and close the exhaust gas passage 62, by rotational movement of the actuating arm within the opening 70 and sleeve 72 caused by actuating end 74.

The placement or seating of the exhaust bypass valve diaphragm 66 over the exhaust gas passage 62 prevents exhaust gas within the turbine housing volute from exiting therefrom. The bypass valve 60 is actuated, e.g., in response to a control signal sent to a bypass valve actuating means from an intake manifold pressure sensor during turbocharger operating conditions causing the intake air pressure to be greater than desired. Once actuated, the bypass valve 60 permits the passage of exhaust gas from the turbine volute, through the exhaust gas passage 62, and into the turbine housing central opening 34 where it allowed to exit the turbocharger via the turbine elbow casting exhaust gas outlet 14. The removal of exhaust gas from the turbine housing volute during operation of the turbocharger reduces the volumetric flowrate of exhaust gas through the volute and onto the turbine blades, reducing the rotational speed of the turbine and, thereby reducing the rotational speed of the air compressor and the amount by which the intake air leaving the combustion housing of the turbocharger is pressurized. Once the desired intake air pressure conditions are restored, the exhaust bypass valve may be actuated to seal or regulate the amount by which the exhaust gas passage 60 is covered.

The turbocharger turbine housing and turbine elbow casting, constructed according to principles of this invention, are attached together according to conventional practice and are combined with other parts conventionally associated with turbochargers to provide a turbocharger for internal combustion engines that incorporates an exhaust valve, an EGR control valve, and an exhaust bypass or wastegate valve therein. A feature of this invention is that both the EGR control valve and the exhaust bypass valve is incorporated into the construction of the turbocharger itself, rather than being an individual device ancillary to engine and turbocharger, thereby avoiding the need for additional space within an engine compartment and maximizing the limited space available within modern engine compartments. Additionally, the turbocharger turbine housing and turbine elbow casting, constructed according to principles of this invention, incorporates the EGR control valve and the exhaust bypass valve therein in a manner that does not adversely impact turbocharger or EGR control valve performance.

For the embodiments shown in the drawings, the EGR control valve and bypass control valves are mounted in the turbine housing and the EGR chambers and bypass chambers are sized to cooperatively accommodate actuation of the valves and provide the required flow paths. In alternative embodiments, one or both valves are mounted in the elbow casting and the bypass chambers and EGR chambers of the elbow casting and turbine housing are adjusted in size accordingly.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A turbocharger for internal combustion engines comprising:
   a turbine housing including:
      an EGR chamber disposed therein that is separated from an exhaust gas outlet of the housing, wherein the EGR chamber includes an exhaust gas passage that extends from the EGR chamber to a volute within the turbine housing; and
      an exhaust bypass chamber disposed therein that is separated from the EGR chamber, and that is in exhaust flow communication with an exhaust gas outlet of the housing, wherein the bypass chamber includes a bypass exhaust gas passage that extends from the bypass chamber to a volute within the turbine housing;
   an EGR control valve disposed within the EGR chamber and positioned over the exhaust gas passage to control the passage of exhaust gas from the volute and out of the turbine housing;
   an exhaust bypass valve disposed within the bypass chamber and positioned over the bypass exhaust gas passage to control the passage of exhaust gas from the volute and out of the turbine housing; and
   a flow path for EGR gas from the EGR chamber.

2. A turbocharger as defined in claim 1 further including a turbine elbow casting attached to the turbine housing having:
   an exhaust gas outlet that extends therethrough and that is positioned adjacent the turbine housing exhaust gas outlet;
   an exhaust valve disposed within the turbine elbow casting exhaust gas outlet; and wherein the EGR gas flow path comprises:
   an EGR chamber disposed within the turbine elbow casting and opposite to the turbine housing EGR chamber, wherein the turbine elbow casting EGR chamber is separate from the turbine elbow casting exhaust gas outlet; and
   an exhaust bypass chamber disposed within the turbine elbow casting and opposite to the turbine housing exhaust bypass chamber, wherein the turbine elbow casting exhaust bypass chamber is separate from the turbine elbow casting EGR chamber and is in exhaust flow communication with the turbine elbow casting exhaust gas outlet.

* * * * *